United States Patent
Faruque et al.

(10) Patent No.: US 9,162,598 B2
(45) Date of Patent: Oct. 20, 2015

(54) MOVEABLE VEHICLE ARMREST ASSEMBLY

(71) Applicant: Ford Global Technologies, LLC, Dearborn, MI (US)

(72) Inventors: Mohammed Omar Faruque, Ann Arbor, MI (US); Dean M. Jaradi, Macomb, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 41 days.

(21) Appl. No.: 14/101,688

(22) Filed: Dec. 10, 2013

(65) Prior Publication Data

US 2015/0158402 A1    Jun. 11, 2015

(51) Int. Cl.
*B60N 2/46* (2006.01)
*B60N 2/427* (2006.01)
*B60J 5/04* (2006.01)

(52) U.S. Cl.
CPC .............. *B60N 2/4666* (2013.01); *B60J 5/0456* (2013.01); *B60N 2/427* (2013.01); *B60N 2/42781* (2013.01)

(58) Field of Classification Search
CPC .......... A47C 7/54; A47C 7/543; A47C 16/00; B60J 5/04; B60J 5/0456; B60N 2/42; B60N 2/4235; B60N 2/427; B60N 2/4278; B60N 2/45; B60N 2/46; B60N 2/466; B60R 2011/0014; B60R 2021/0006; B60R 2021/0273; B60R 21/0428
See application file for complete search history.

(56) References Cited

U.S. PATENT DOCUMENTS

| 2,178,788 | A | * | 11/1939 | Haines ..................... 297/411.21 |
| 2,897,000 | A | * | 7/1959 | McBride et al. .............. 296/153 |
| 3,951,452 | A | | 4/1976 | Harder, Jr. |
| 4,881,754 | A | | 11/1989 | Luetze et al. |
| 5,181,759 | A | | 1/1993 | Doolittle |
| 5,290,087 | A | | 3/1994 | Spykerman |
| 5,531,470 | A | | 7/1996 | Townsend |
| 5,577,794 | A | * | 11/1996 | Gandhi et al. ............. 296/146.6 |
| 5,746,443 | A | | 5/1998 | Townsend |
| 5,911,434 | A | | 6/1999 | Townsend |
| 6,568,743 | B1 | | 5/2003 | Jayasuriya et al. |
| 6,905,163 | B2 | | 6/2005 | Boemchen et al. |
| 6,983,967 | B2 | | 1/2006 | Scheidmantal et al. |
| 7,195,312 | B2 | | 3/2007 | Crossman et al. |
| 7,537,268 | B2 | | 5/2009 | Becker et al. |
| 7,654,597 | B1 | * | 2/2010 | Farooq ......................... 296/1.09 |
| 7,934,771 | B2 | | 5/2011 | Tamakoshi et al. |
| 7,992,347 | B2 | | 8/2011 | Roy et al. |
| 8,297,684 | B1 | * | 10/2012 | Flamard et al. ............... 296/153 |

(Continued)

FOREIGN PATENT DOCUMENTS

| DE | 19848132 A1 | * | 4/2000 | .............. A47C 7/54 |
| DE | 102005018521 A1 | * | 10/2006 | |

(Continued)

*Primary Examiner* — Glenn Dayoan
*Assistant Examiner* — Paul Chenevert
(74) *Attorney, Agent, or Firm* — Frank A. MacKenzie; Brooks Kushman P.C.

(57) ABSTRACT

A vehicle includes an armrest and a hinge assembly. The hinge assembly supports the armrest and is rotatable between extended and collapsed positions. The hinge assembly includes a pin configured to move between locked and released positions. When the pin is in the locked position, the hinge assembly is locked in the extended position. When the pin is in the released position, the pin is configured to permit rotation of the hinge assembly toward the collapsed position.

13 Claims, 4 Drawing Sheets

(56) References Cited

U.S. PATENT DOCUMENTS

| | | | |
|---|---|---|---|
| 2006/0236749 A1* | 10/2006 | Wanami et al. | 73/12.09 |
| 2007/0039245 A1 | 2/2007 | Buchta et al. | |
| 2009/0045663 A1 | 2/2009 | Tamakoshi et al. | |
| 2009/0152848 A1* | 6/2009 | Sadr et al. | 280/730.2 |
| 2011/0251760 A1* | 10/2011 | Aoki et al. | 701/45 |
| 2012/0222360 A1 | 9/2012 | Schryer | |
| 2013/0320711 A1* | 12/2013 | Nascimento et al. | 296/190.08 |

FOREIGN PATENT DOCUMENTS

| | | | | |
|---|---|---|---|---|
| DE | 102007024881 A1 | * | 12/2008 | B60N 2/46 |
| DE | 102008057639 | * | 5/2010 | B60R 21/02 |
| FR | 2813565 A1 | * | 3/2002 | B60N 3/00 |
| FR | 2878477 A1 | * | 6/2006 | |
| FR | 2897306 A1 | * | 8/2007 | B60J 5/06 |
| FR | 2928315 A1 | * | 9/2009 | B60N 2/46 |
| WO | WO 2009065614 A2 | * | 5/2009 | |

\* cited by examiner

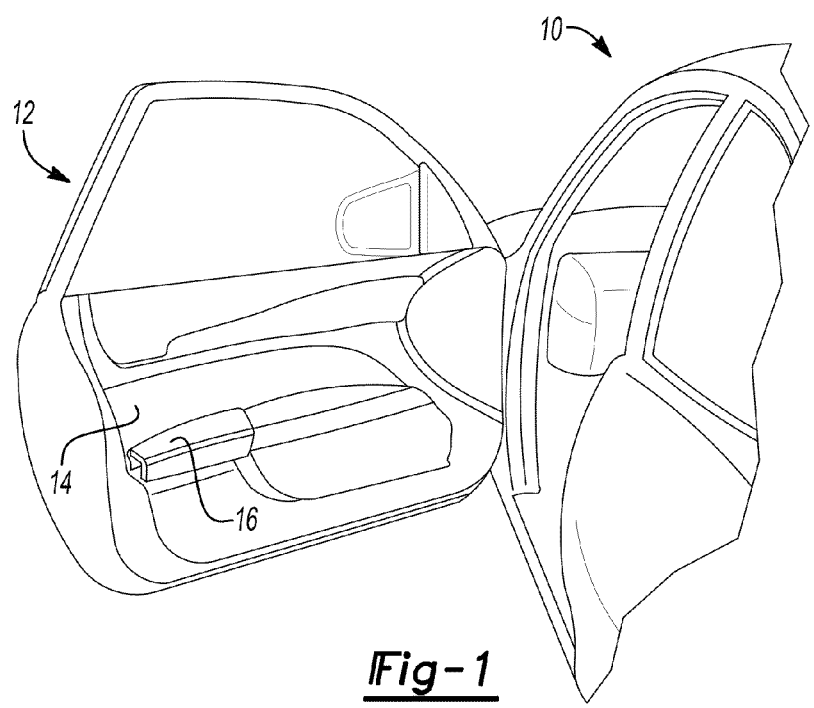
Fig-1
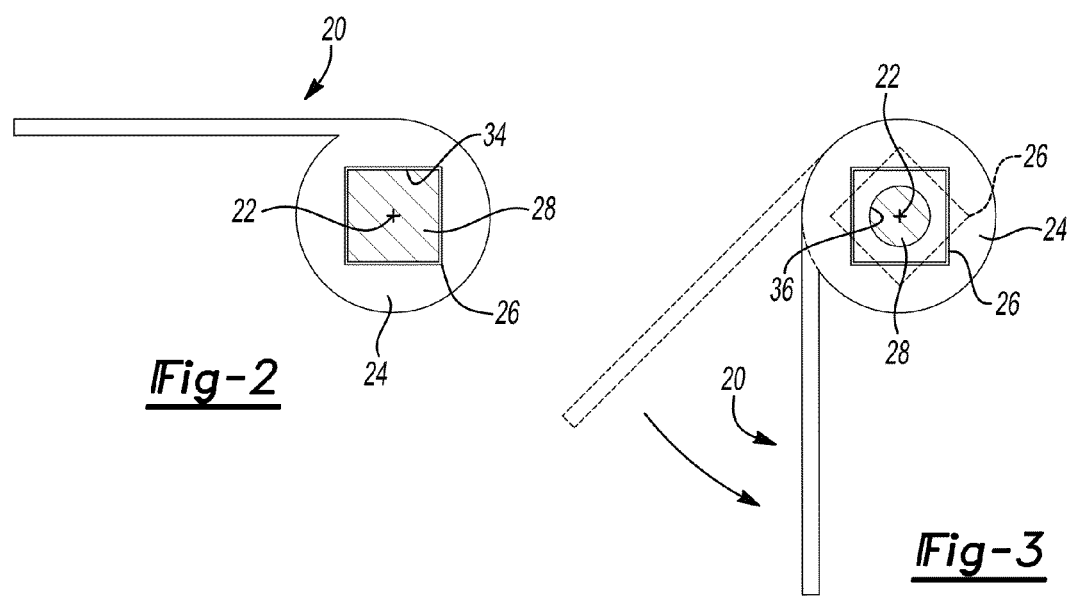
Fig-2
Fig-3

MOVEABLE VEHICLE ARMREST ASSEMBLY

TECHNICAL FIELD

This disclosure relates to vehicle door assemblies.

BACKGROUND

During vehicle impact, maintaining interior cabin space may be desirable. To maintain vehicle interior cabin space, it is known to construct a moveable armrest. Upon impact, the moveable armrest may yield or deform. Typically once deformed the door panel and armrest cannot be reset. Thus, a false-positive actuation of the moveable armrest is less than ideal: the entire door assembly may have to be replaced.

SUMMARY

A vehicle includes door panels, an armrest, and a hinge assembly. The hinge assembly is disposed between the door panels and supports the armrest. Comprised of a hinge member and a pin, the hinge assembly has an axis of rotation. A pin receiving portion is defined through the hinge member along the axis of rotation. Disposed within the pin receiving portion, the pin has a locking portion and a releasing portion. The pin is configured to move through the pin receiving portion and between the locked and released positions.

The locking portion engages the hinge member within the pin receiving portion. The engagement between the locking portion of the pin and the hinge member locks the armrest in place. This defines a locked position. The releasing portion permits the hinge member to rotate about the axis. Rotation about the axis collapses the armrest toward the interior trim of the door panel. This defines a released position.

A door assembly includes an armrest and a hinge assembly. The hinge assembly includes a pin. The pin has a locked and a released position. Configured to move between the locked and the released positions, the pin slides through the hinge assembly. The locked position of the pin locks the hinge assembly in an extended position. The released position allows the hinge assembly to rotate into a collapsed position. The hinge assembly supports the armrest. Therefore, when the hinge assembly is locked in the extended position, the armrest is also locked in the extended position. Likewise, when the hinge assembly is in the collapsed position, the armrest is also in the collapsed position.

The vehicle door assembly may also include a biasing member. The biasing member may be disposed proximate the armrest and may be connected to the hinge assembly. Movement of the pin toward the released position compresses the biasing member. Compressing the biasing member opposes pin movement toward the released position, pushing the pin from the released position toward the locked position. Moving from the released position to the locked position may rotate the hinge assembly from the collapsed position to the extended position. Rotating from the collapsed position to the extended position resets the armrest.

A door assembly includes door panels, an armrest, and a hinge assembly. Disposed between the door panels supporting the armrest, the hinge assembly includes a hinge member defining a pin-receiving portion. The hinge assembly further includes a pin. The pin has a first portion and a second portion. The first portion of the pin, configured to engage the pin-receiving portion, locks the hinge member and armrest in place.

The second portion of the pin, configured to float within the pin-receiving portion, permits the hinge member and the armrest to rotate. The armrest, supported by the hinge assembly, is rigid when in the locked position. Further, the armrest is collapsed toward the interior of the door panel when in the released position.

Embodiments disclosed herein may provide a number of advantages. For example, the armrest and hinge assembly may be reset such that the armrest and hinge assembly may be reused after an impact The above advantage and other advantages and features of the present disclosure will be readily apparent from the following detailed description when taken in connection with the drawings.

BRIEF DESCRIPTION OF THE DRAWINGS

FIG. 1 is a perspective view of a vehicle door assembly.

FIG. 2 is a side view of a hinge assembly in the extended position.

FIG. 3 is a side view of the hinge assembly in the collapsed position.

DETAILED DESCRIPTION

Figure 4:
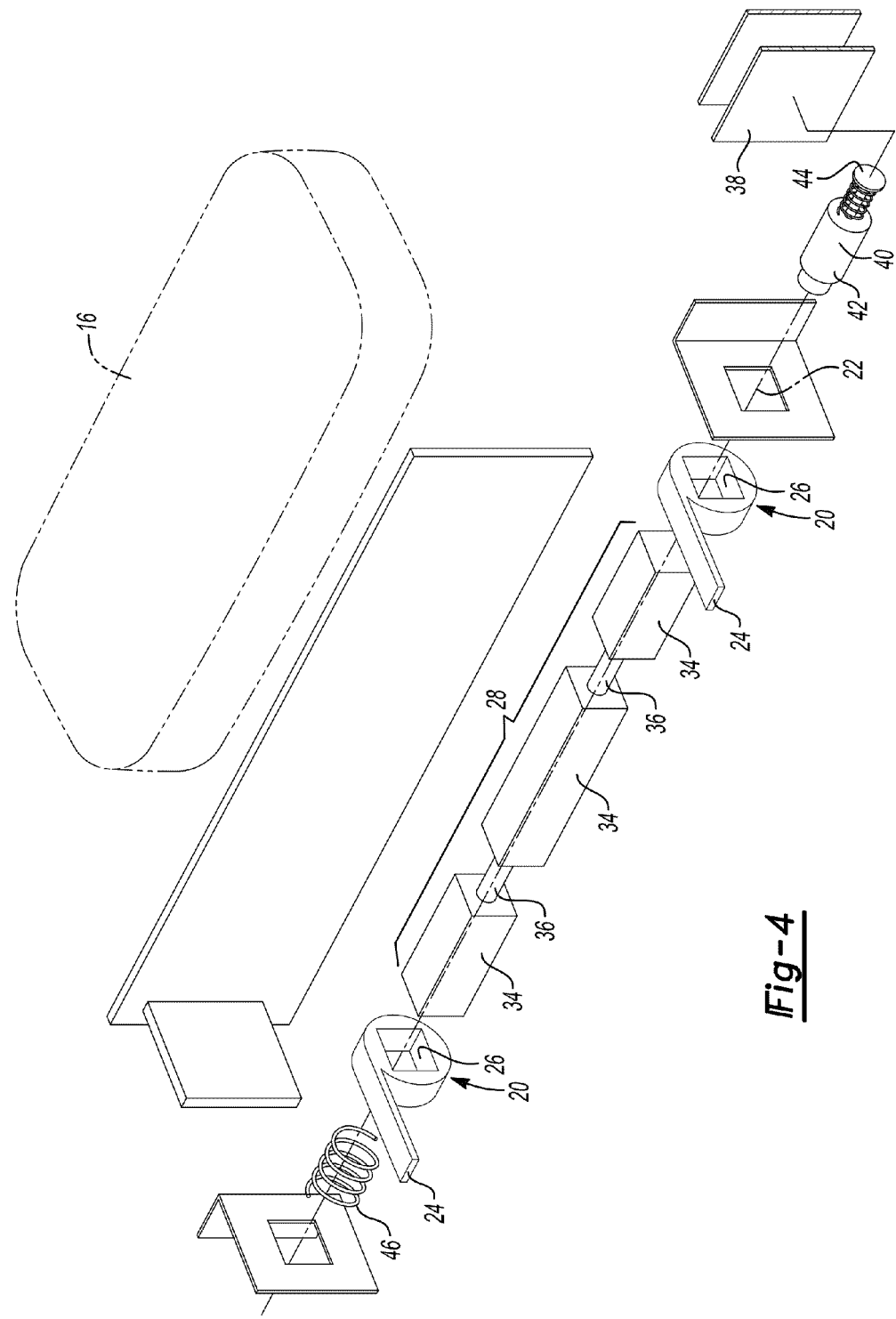
FIG. 4 is an exploded view of an armrest and the hinge assembly.

As those of ordinary skill in the art will understand, various features of the present invention are illustrated and described with reference to any one of the Figures and may be combined with features illustrated in one or more other Figures to produce embodiments of the present disclosure that are not explicitly illustrated or described. The combinations of features illustrated provide representative embodiments for typical applications. However, various combinations and modifications of the features consistent with the teachings of the present disclosure may be desired for particular applications or implementations.

During impact, maintaining interior cabin space may be desirable as mentioned above. This may be achieved using a conventional collapsible armrest responsive to sensors. The use of sensors, however, may increase the likelihood of false-positive readings based on the sensitivity of the sensors. Also, sensors may add cost and complexity to the manufacturing process. Moreover once collapsed, such an armrest cannot be reset. That is, the armrest may not be returned to its pre-impact position. As such, it must be replaced during repair.

Referring to FIG. 1, a vehicle 10 is shown having a door assembly 12 including a door panel 14 and an armrest 16 that moves upon impact and may be reset after impact. The armrest 16 thus provides for more interior cabin space during impact. Additional cabin space allows more room for airbags and other safety devices. Further, in the case of a slight or accidental impact with the vehicle door assembly 12, the armrest 16 may be reused as opposed to replaced. Instead of replacing the entire door assembly 12, the armrest 16 may relock and be useable under normal operating conditions.

Referring to FIGS. 2 and 3, a hinge assembly 20 used to collapse and extend the armrest 16 is described. The hinge assembly 20 has an axis of rotation 22 and includes a hinge member 24 defining a pin receiving portion 26, and a pin 28. The pin 28 fits into the pin receiving portion 26 and is configured to slide along the axis of rotation 22. As the pin 28 slides through the pin receiving portion 26, the hinge assembly 20 moves between a locked position, shown in FIG. 2 and a released position, shown in FIG. 3. The locked position corresponds to a locking portion 34 of the pin 28. When the locking portion 34 engages the hinge member 24 within the pin receiving portion 26 the locking portion 34 locks the hinge member 24 and the armrest 16 in place.

Having a cross-sectional area substantially equal to the cross-sectional area of the pin receiving portion 26, the locking portion 34 engages the hinge member 24. In FIG. 2, the locking portion 34 may have a square cross-section. Likewise, the pin-receiving portion 26 may have a complementary square cross-section fitting around the locking portion 34. Engagement between the hinge member 24 and the locking portion 34 of the pin 28 prevents rotation of the hinge member 24. Preventing rotation of the hinge member 24 makes the hinge assembly 20 stationary. When the hinge assembly 20 is stationary, the armrest 16 is locked in place. This allows the armrest 16 to be operable under normal operating conditions. The relationship between the hinge member 24, the locking portion 34 of the pin 28, and the pin receiving portion 26 is depicted in FIG. 2.

FIG. 3 depicts the released position. The released position corresponds to a released portion 36 of the pin 28. Having a cross-sectional area substantially less than the cross-sectional area of the pin receiving portion 26, the released portion 36 does not engage the hinge member 24. For example as depicted in FIG. 3, the released portion 36 may have a circular cross-section. The circular cross-section of the released portion 36 would not engage with the square cross-section of the pin receiving portion 26. By not engaging the hinge member 24, the released portion 36 allows the hinge member 24 to rotate about the axis of rotation 22. Therefore, as the pin 28 slides axially along the pin receiving portion 26, the hinge assembly 20 rotates from the locked position shown in FIG. 2 to the released position shown in FIG. 3. Free rotation about the axis of rotation 22 collapses the hinge assembly 20 toward the door assembly 12 creating more space in the interior cabin of the vehicle 10.

Referring to FIG. 4, the armrest 16 and the hinge assembly 20 are provided. The hinge assembly 20 supports the armrest 16 and includes the hinge member 24 defining the pin receiving portion 26, and the pin 28. The pin receiving portion 26 receives the pin 28 and allows the pin 28 to slide axially along the axis of rotation 22. The pin 28 has two portions. The first portion 34, when received by the pin receiving portion 26, engages the hinge member 24. Engagement between the hinge member 24 and the pin receiving portion 26 causes the hinge assembly 20 to be rigid. When the hinge assembly 20 is rigid, the armrest 16 is in the locked position defined by the pin 28. When in the locked position, the armrest 16 is capable of supporting an occupant arm (not shown) during normal operation of the vehicle 10.

Unlike the first portion 34, the second portion 36 of the pin 28 does not engage the hinge member 24. The second portion 36, when received by the pin receiving portion 26, allows the hinge member 24 to rotate freely about the axis of rotation 22. Rotation of the hinge member 24 about the axis 22 collapses the armrest 16. This defines the released position. When in the released position, the armrest 16 moves away from a vehicle occupant's body (not shown). Sliding between the first 34 and second 36 portions, from the locked to the released positions, happens in response to an activation signal. The activation signal may be prompted by an impact with the vehicle door assembly 12.

Engagement between the hinge member 24 and the first portion 34 may be dependent on a shape. For example as depicted in FIG. 4, the pin receiving portion 26 may be defined as a square. Similarly the first portion 34 may have a complementary square shape. FIG. 4 also depicts the relationship between the pin receiving portion 26 of the hinge member 24 and the second portion 36 of the pin 28. As an example, FIG. 4 depicts the pin receiving portion 26 as square and the second portion 36 of the pin 28 as circular. These examples are merely illustrative and not definitive. For example, the first portion 34 may be triangular and the second portion 36 may be round/square. Also, the first portion 34 may be hexagonal and the second portion 36 may be circular. The shape of the pin portions 34, 36 may also be adjusted to promote varying degrees of rotation. For example, if it were advantageous to rotate the armrest.

As an object impacts the door panel assembly 12, a contact plate 38 moves in an inward direction. The inward movement of the contact plate 38 causes an activation signal to be sent to an actuation mechanism 40. The actuation mechanism 40 may be any stored energy device, or more specifically a transducer. As an example, the transducer may be a solenoid 42. Attached to the pin 28, the actuation mechanism 40 forces the pin 28 to slide through the pin receiving portion 26 of the hinge member 24. As the pin 28 slides, the first portion 34 disengages from the hinge member 24 moving the second portion 36 within the pin receiving portion 26. For example using a solenoid 42 as the actuation mechanism 40, movement of the contact plate 38 in an inward direction completes the circuit and actuates the solenoid 42. Once the circuit is complete and the solenoid 42 is actuated, the stroking pin 44 of the solenoid 42 acts against the pin 28 sliding the pin 28 through the pin receiving portion 26 of the hinge member 24. As the pin 28 slides, the first portion 34 disengages from the hinge member 24 and the hinge member 24 rotates about the axis 22.

FIG. 4 further depicts a biasing member 46. The biasing member 46 may be disposed at any point in which it acts on the pin 28 and against the actuation mechanism 40. For example, the biasing member 46 may be disposed between the pin 28 and the actuation mechanism 40. Further, the biasing member 46 may be disposed with the pin 28 between the biasing member 46 and the actuation mechanism 40. After the actuation mechanism 40 forces the pin 28 through the pin receiving portion 26, the biasing member 46 compresses. As the biasing member 46 compresses, it acts on the pin 28 pushing the pin 28 back through the pin receiving portion 26 of the hinge member 24. The second portion 36 slides through the pin receiving portion 26 and the first portion 34 re-engages the hinge member 24 within the pin receiving portion 26. When the first portion 34 re-engages the hinge member 24, the hinge member 24 rotates back into the locked position. The biasing member 46 allows the armrest 16 and hinge assembly 20 to be resettable. This may be advantageous as it eliminates the need for a sensor. By not using a sensor, the armrest 16 and the hinge assembly 20 are more easily manufactured and implemented, and less likely to be affected by sensor false-positive readings.

Figure 5:
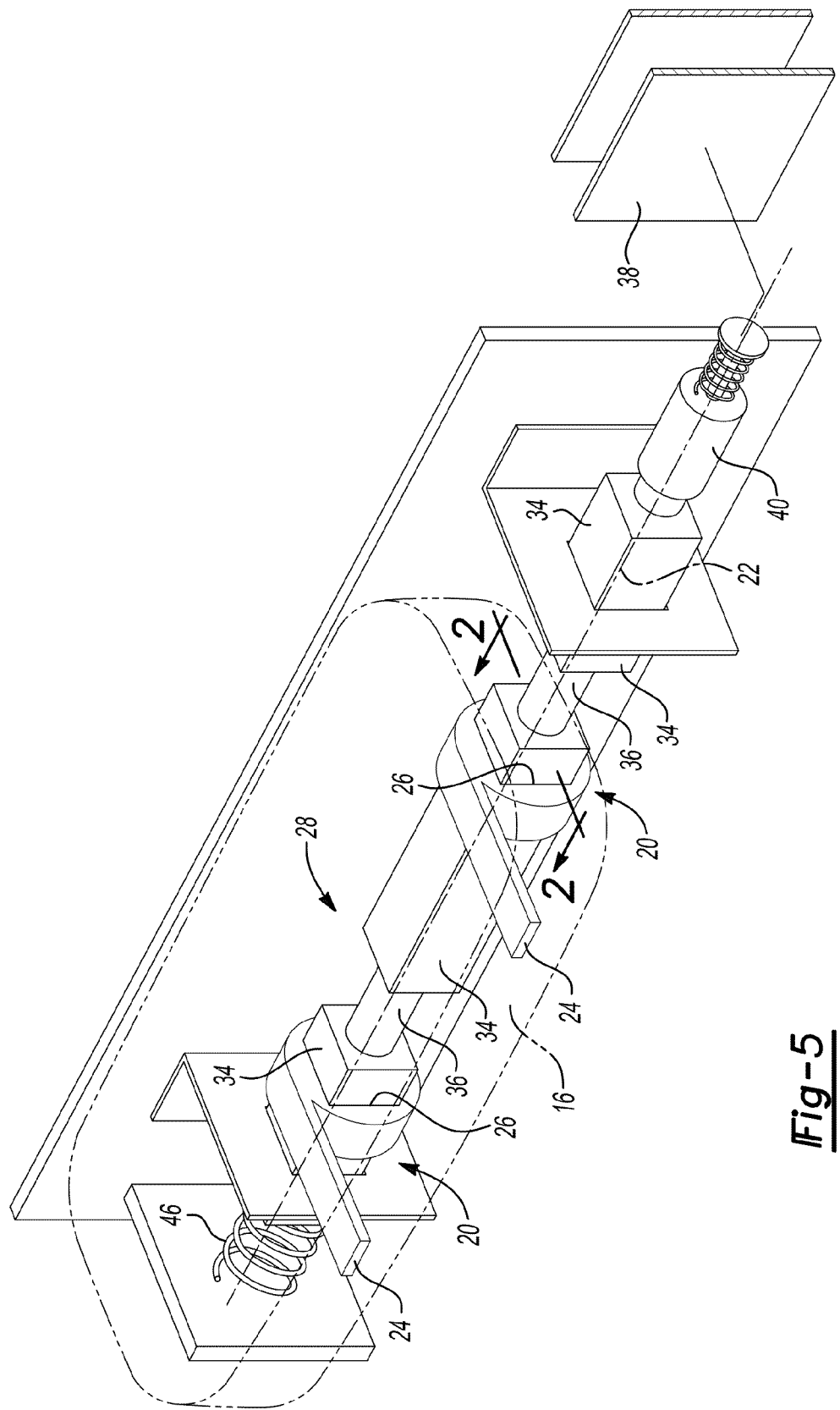
FIG. 5 is a perspective view of the armrest and the hinge assembly in the extended position.
Figure 6:
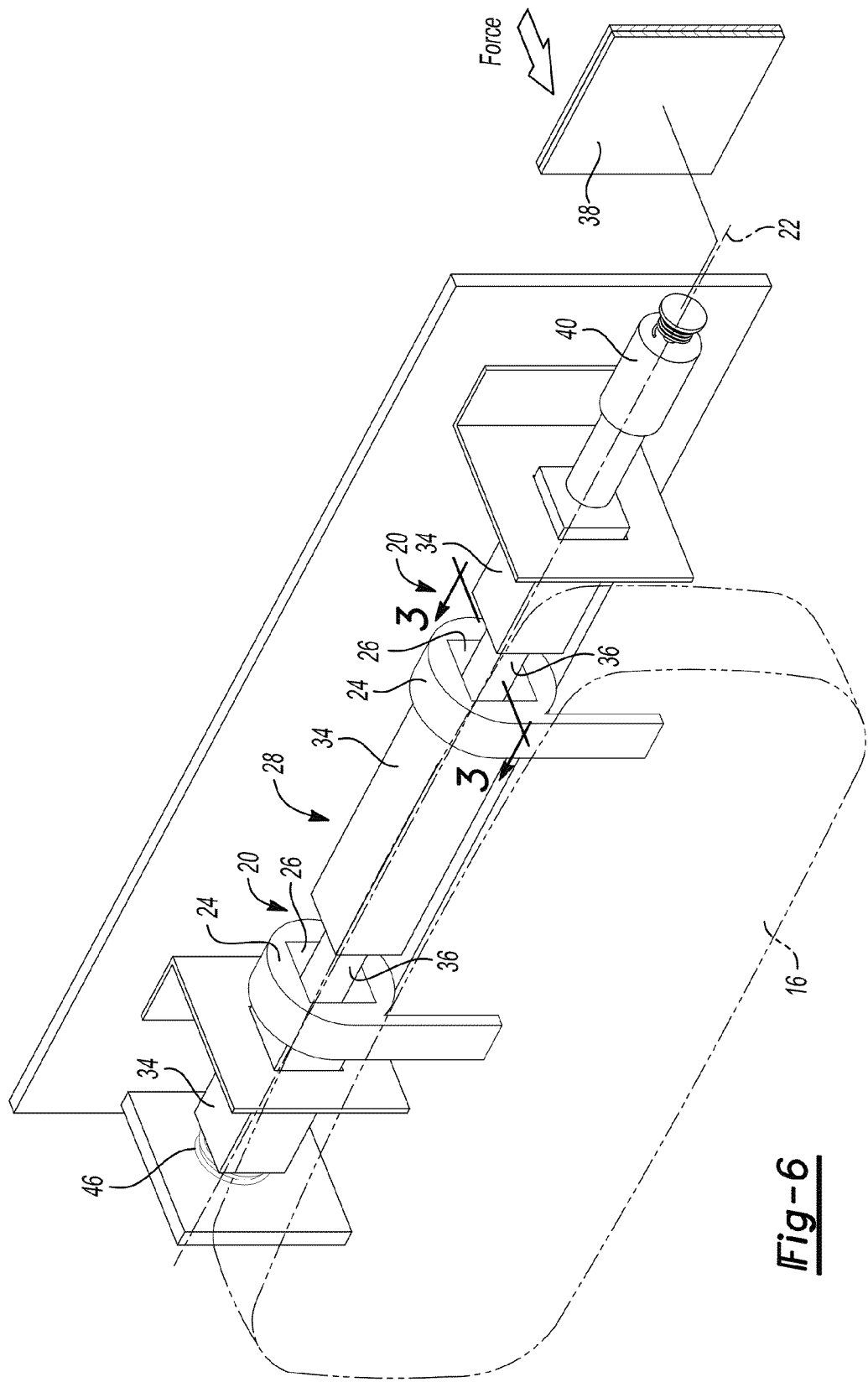
FIG. 6 is a perspective view of the armrest and the hinge assembly in the collapsed position.

Referring to FIGS. 5 and 6, an armrest 16 and hinge assembly 20 is provided. FIG. 5 shows the armrest 50 and hinge assembly 20 in an extended position. FIG. 6 shows the armrest 16 and hinge assembly 20 in the collapsed position. The extended and collapsed positions are defined by the relationship between a hinge member 24 and a pin 28, comprising the hinge assembly 20. The hinge member 24 defines a pin receiving portion 26. The pin 28 slides through the pin receiving portion 26 along an axis 22. As the pin 28 slides along the axis 22, the hinge member 24 engages the pin at two positions, a locked position 34 and a released position 36. When the locked position 34 is within the pin-receiving portion 26, the pin 28 engages the hinge member 24. The cross-sectional area of the locked position 34 complements the cross-sectional area of the pin receiving portion 26. This allows the pin 28 to prevent the hinge member 24 from rotating about the axis 22, securing the hinge member 58 in the extended position. This arrangement is depicted in FIG. 5. FIG. 5 shows the relationship between the locked position and the pin receiving portion 26 as square complements. The relationship between the locked position and the pin receiving portion 26 could also be circular or hexagonal complements.

The second position of the pin 28 is the released position 36. The released position 36 has a cross-sectional area substantially less than the cross-sectional area of the pin receiving portion 26. This allows the pin 28 to float within the hinge member 24. When the pin 28 floats, the hinge member 24 is rotatable about the axis 22. As the hinge member 24 rotates, the armrest 16 moves toward the interior of the vehicle door (not shown) creating more interior cabin space. This rotation defines the collapsed position and is shown in FIG. 6. FIG. 6 depicts the relationship between the released position 36 and the pin receiving portion 26 as circular to square. This relationship could also include varying shapes such as square to hexagonal, or square to circular, respectively.

The transducer 40 is engaged with the pin 28 and the vehicle door (not shown). Upon an impact with the vehicle door, the transducer 40 is actuated. Once actuated, the transducer 40 engages the pin 28 causing the pin 28 to slide through the pin receiving portion 26. This moves the pin 28 from the locked 66 position to the released 36 position. As the transducer 70 slides the pin 28 from the locked 66 to the released 36 position, the pin 28 disengages from the hinge member 24. Therefore, actuation of the transducer 40 moves the pin 28 along the axis 22 from the locked position 66 to the released position 68 and simultaneously the hinge assembly 20 from the extended to the collapsed position. The transducer 40 may be any stored energy device, for example a solenoid.

The transducer 40 is actuated using the contact plate 38. Connected to the transducer 40, the contact plate 38 is disposed within the vehicle door assembly. An impact with the vehicle door assembly moves the contact plate 38 inward. Inward movement of the contact plate 38 actuates the transducer 40. Referring to the solenoid example, when the contact plate 38 moves inwardly it completes an electrical circuit. Once the circuit is complete, the solenoid is actuated, and the pin 28 moves through the pin receiving portion 26. The contact plate 38 arrangement may be used with any stored energy device. As a further example, the contact plate 38 may be used to actuate a pneumatic transducer 40. In this example, inward movement of the contact plate 38 would force an incompressible non-freezing fluid through the pneumatic line actuating the pneumatic transducer 40. Using the contact plate 38 instead of a sensor helps to eliminate any false-positive actuation of the transducer 40. The sensor may give a false reading based on movement that may not cause an impact with the vehicle door assembly. The contact plate 38, however, is triggered simultaneously with an impact with the vehicle door assembly. Providing a near simultaneous collapse of the armrest 16 eliminates the problem of a false actuation.

The biasing member 46 is oppositely engaged with the transducer 40. After the transducer 40 strikes the pin 28, the biasing member 46 is compressed. As the biasing member 46 is compressed, it acts oppositely from the transducer 40. It pushes on the pin 28 to slide the pin 28 back through the pin receiving portion 26. The biasing member 46 moves the pin 28 from the released position 36 to the locked position 34.

When moved from the released position 36 to the locked position 34, the pin 28 reengages the hinge member 24. This reengagement allows the armrest 16 and the hinge member 24 to rotate from the collapsed position to the extended position. The biasing member 46 allows the hinge assembly 52 to be resettable.

The ability to rest the hinge assembly 20 accounts for errors that may have falsely actuated the transducer 40. Further, the reset feature of the door accounts for minor impacts that may not have damaged the door. When a minor impact actuates the transducer 40, the biasing member 46 allows the hinge assembly 20 to move back into the extended position. This saves time, cost, and manufacturing expenses. And, the entire vehicle door need not be replaced after impact.

Although certain examples have been described, those familiar with the art will recognize various alternative designs and embodiments within the scope of the following claims. And although various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments discussed herein that are described as less desirable than other embodiments are prior art implementations with respect to one or more characteristics are not outside the scope of the disclosure and may be desirable for particular applications.

What is claimed is:

1. A vehicle comprising:
   door panels;
   an armrest; and
   a hinge assembly disposed between the panels and supporting the armrest, the hinge assembly having an axis of rotation and including a hinge member defining a pin receiving portion about the axis, a pin including a locking portion and a releasing portion disposed within the pin receiving portion and configured to move without rotating between locked and released positions, and a transducer arranged to move the pin from the locked position to the released position in response to an activation signal, the locking portion being configured to engage the pin receiving portion to lock the hinge member and armrest in place when the pin is in the locked position, and the releasing portion being configured to permit the hinge member and armrest to rotate about the axis when the pin is in the released position to increase cabin space in the vehicle.

2. The vehicle of claim 1, wherein the transducer is a solenoid.

3. The vehicle of claim 1, wherein the transducer comprises a contact plate disposed adjacent the door panels and movable in an inward direction in response to the activation signal such that inward movement of the contact plate actuates the transducer.

4. The vehicle of claim 1, wherein the hinge assembly further includes a spring arranged to oppose movement of the pin from the locked position to the released position.

5. The vehicle of claim 1, wherein a cross-sectional area of the locking portion is greater than the cross-sectional area of the releasing portion.

6. The vehicle of claim 1, wherein a shape of the pin receiving portion is a complement of a shape of the locking portion.

7. A vehicle door comprising:
an armrest;
a hinge assembly supporting the armrest and rotatable between extended and collapsed positions, and including a pin configured to
   move without rotating between locked and released positions,
   lock the hinge assembly in the extended position when in the locked position, and
   permit rotation toward the collapsed position when in the released position; and
a transducer arranged to move the pin from the locked position to the released position.

8. The vehicle door according to claim 7 further comprising a biasing member proximate the armrest and connected to the hinge assembly, wherein movement of the pin to the released position actuates the biasing member such that the biasing member opposes the movement of the pin to the released position.

9. The vehicle door of claim 7, wherein the transducer is a solenoid.

10. A door assembly comprising:
door panels;
an armrest;
a hinge assembly disposed between the panels and configured to support the armrest, the hinge assembly including a hinge member defining a pin receiving portion and a moveable, non-rotatable pin having a first portion configured to engage the pin receiving portion to lock the hinge member and armrest in place and a second portion configured to float within the pin receiving portion to permit the hinge member and arm rest to rotate about the pin; and
an actuation mechanism having a first end arranged proximate an outer wall of one of the door panels and a second end arranged adjacent the pin such that deformation of the outer wall causes the actuation mechanism to move the pin.

11. The door assembly according to claim 10, wherein the actuation mechanism is a transducer.

12. The door assembly according to claim 10 further comprising a biasing member arranged to oppose movement of the pin.

13. The door assembly according to claim 12 wherein the biasing member is a spring.

* * * * *